(12) United States Patent
Hur et al.

(10) Patent No.: US 11,528,992 B2
(45) Date of Patent: Dec. 20, 2022

(54) POWER RECLINER

(71) Applicant: DAEWON PRECISION INDUSTRIAL CO., LTD., Ansan-si (KR)

(72) Inventors: Yoon Ho Hur, Seoul (KR); Dong Il Kim, Incheon (KR); Kyu Ha Shin, Ansan-si (KR)

(73) Assignee: DAEWON PRECISION INDUSTRIAL CO., LTD., Gyeonggi-do (KR)

( * ) Notice: Subject to any disclaimer, the term of this patent is extended or adjusted under 35 U.S.C. 154(b) by 0 days.

(21) Appl. No.: 17/402,001

(22) Filed: Aug. 13, 2021

(65) Prior Publication Data

US 2022/0104621 A1    Apr. 7, 2022

(30) Foreign Application Priority Data

Oct. 7, 2020   (KR) .................... 10-2020-0129650
Nov. 10, 2020  (KR) .................... 10-2020-0149175

(51) Int. Cl.
   *B60N 2/22*     (2006.01)
   *B60N 2/225*    (2006.01)
   *A47C 1/025*    (2006.01)
   *B60N 2/02*     (2006.01)
   *A47C 1/024*    (2006.01)
   *B60N 2/235*    (2006.01)

(52) U.S. Cl.
   CPC ............ *A47C 1/025* (2013.01); *A47C 1/0242* (2013.01); *B60N 2/0232* (2013.01); *B60N 2/2356* (2013.01)

(58) Field of Classification Search
   CPC ... B60N 2/2213; B60N 2/0232; B60N 2/2356
   USPC ........................................................ 297/362
   See application file for complete search history.

(56) References Cited

U.S. PATENT DOCUMENTS

| 6,619,743 B1* | 9/2003 | Scholz .................... B60N 2/225 |
| | | 297/362 X |
| 7,090,299 B2* | 8/2006 | Lange .................. B60N 2/2254 |
| | | 297/362 |

(Continued)

FOREIGN PATENT DOCUMENTS

| KR | 101003718 B1 | 12/2010 |
| KR | 101613449 B1 | 4/2016 |

(Continued)

*Primary Examiner* — Rodney B White
(74) *Attorney, Agent, or Firm* — You & IP, LLC

(57) ABSTRACT

The present disclosure provides a power recliner including a seatback having an angle that is adjusted when an external gear coupled to an accommodation groove of an internal gear is eccentrically rotated as wedges are operated, in which a support groove having a level difference is formed in the accommodation groove of the internal gear and maintains a predetermined radius based on a burring part, in which the wedges are installed and inserted into the support groove so as to be moved along the support groove, and in which when a load is applied to a seatback, the wedges are dually in contact with a cam and an inner stepped surface of the support groove or dually in contact with the burring part of the internal gear and the inner stepped surface of the support groove to disperse the load, thereby improving maximum strength of the recliner.

10 Claims, 16 Drawing Sheets

(56) References Cited

U.S. PATENT DOCUMENTS

| | | | | |
|---|---|---|---|---|
| 7,278,689 | B2* | 10/2007 | Guillouet | B60N 2/2252 297/362 |
| 7,390,061 | B2* | 6/2008 | Lange | B60N 2/2252 297/362 X |
| 7,461,900 | B2* | 12/2008 | Lange | B60N 2/2252 297/362 X |
| 7,607,737 | B2* | 10/2009 | Liebich | B60N 2/2252 297/362 |
| 7,950,741 | B2* | 5/2011 | Mitsuhashi | B60N 2/682 297/362 X |
| 8,262,165 | B2* | 9/2012 | Mitsuhashi | B60N 2/2254 297/362 X |
| 8,672,408 | B2* | 3/2014 | Legras | B60N 2/2252 297/362 X |
| 2008/0136242 | A1* | 6/2008 | Stemmer | B60N 2/2254 297/362 |
| 2014/0225411 | A1* | 8/2014 | Matt | B60N 2/2254 297/362 |
| 2015/0054324 | A1* | 2/2015 | Chang | B60N 2/2254 297/362 |
| 2020/0331367 | A1* | 10/2020 | Schmitz | B60N 2/2254 |

FOREIGN PATENT DOCUMENTS

| | | | |
|---|---|---|---|
| KR | 101711826 | B1 | 3/2017 |
| KR | 101938576 | B1 | 1/2019 |

* cited by examiner

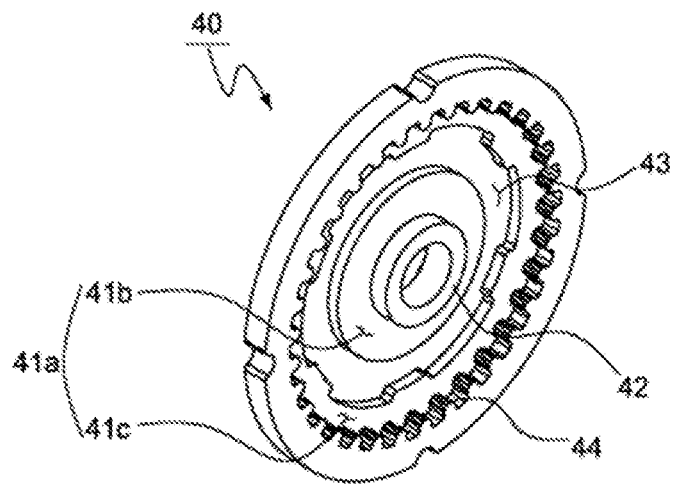
FIG. 3A
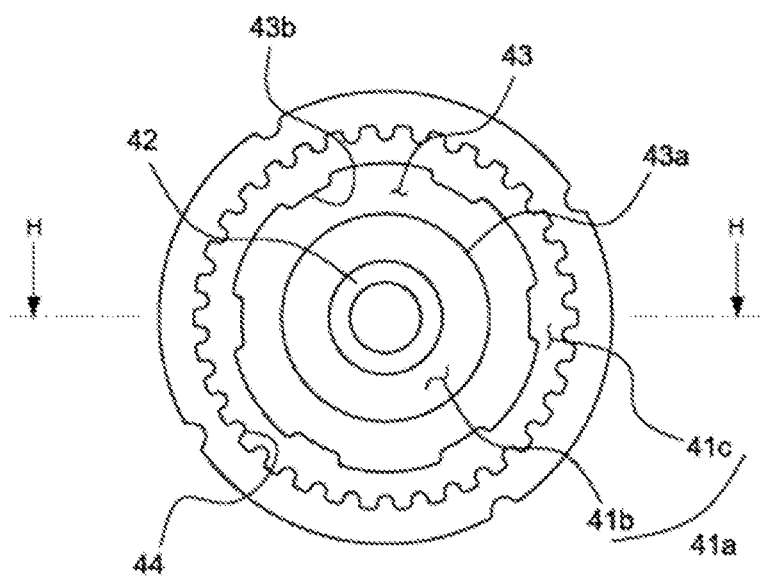
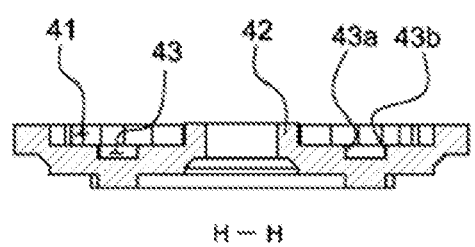
FIG. 3B

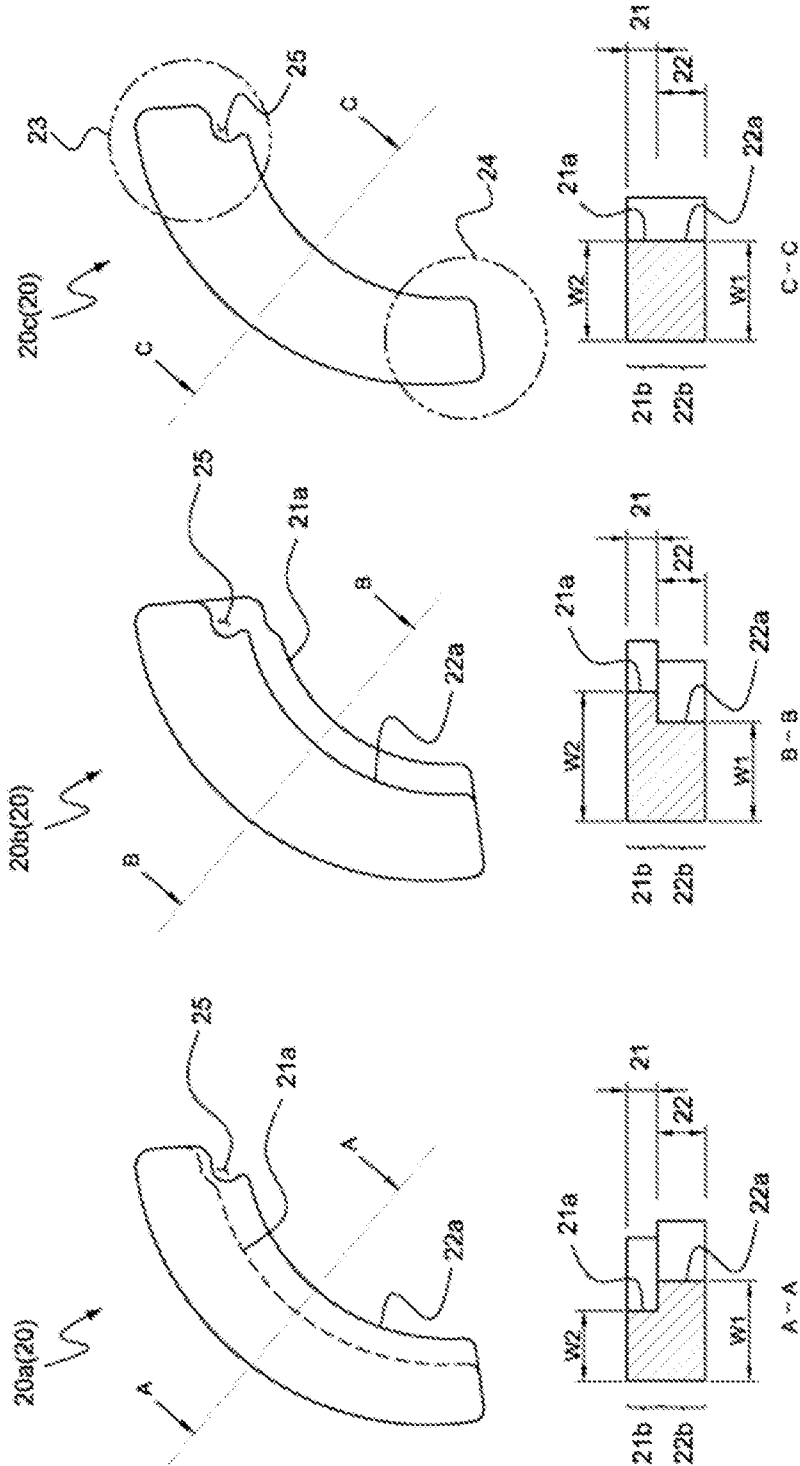

POWER RECLINER

CROSS-REFERENCE TO RELATED APPLICATIONS

This application claims the priority of Korean Patent Application No. 10-2020-0129650 filed on Oct. 7, 2020 and Korean Patent Application No. 10-2020-0149175 filed on Nov. 10, 2020, in the Korean Intellectual Property Office, the disclosure of which is incorporated herein by reference.

BACKGROUND

Field

The present disclosure relates to a power recliner, and more particularly, to a power recliner in which a support groove is formed in an accommodation groove of an internal gear, and wedges are installed and inserted into the support groove so as to be moved along the support groove, such that when a load is applied, one side of the wedges is dually in contact with a cam and an inner sidewall surface of the support groove or dually in contact with a burring part of the internal gear and the inner sidewall surface of the support groove to disperse the load applied to the recliner, thereby improving maximum strength of the recliner.

Description of the Related Art

In general, a recliner enables an angle in a forward-rearward direction of a seatback to be adjusted with respect to a seat cushion. The recliner has a high coupling force between components during a reclining operation to ensure safety of a passenger. The recliners are classified into a manual-type recliner, of which the angle of the seatback is adjusted as a passenger manipulates a lever, and a power-type recliner which is automatically operated by power of a motor through manipulation of a switch.

As illustrated in FIG. 16, a power recliner in the related art includes an internal gear 2 coupled to a seatback (not illustrated) and having internal teeth 2a, and an external gear 3 having an external teeth 3a. The internal gear and the external gear 3 have structurally different sizes (different number of teeth) and different pitch circle diameters (PCDs), such that the external gear 3 is eccentrically coupled to the internal gear 2 in an assembled state. A pair of wedges 4 and 5 interposed in a space between the internal gear 2 and the external gear 3 maintains the eccentric state and maintains a locked state or an unlocked state for the operation of the recliner. In FIG. 16, non-described reference numeral 1 indicates a lever socket, non-described reference numeral 3b indicates a bearing press-fitted into the external gear, and non-described reference numeral 6 indicates a wedge spring.

However, in the case of the recliner in the related art, when an impact load is applied to a front or rear side of the seatback, the load is transmitted to the external gear through the engagement portion between the internal gear and the external gear, and the load transmitted to the external gear is transmitted to a burring part of the internal gear through the wedge and a cam, which causes deformation of the burring part. In particular, when the burring part is deformed, the internal teeth of the internal gear and the external teeth of the external gear are separated from each other, which causes a deterioration in safety strength due to damage to a tooth at a location at which the impact load is concentrated.

DOCUMENTS OF RELATED ART

Patent Documents (Patent Document 1) Korean Patent No. 10-1613449 (Apr. 12, 2016)
(Patent Document 2) Korean Patent No. 10-1003718 (Dec. 17, 2010)
(Patent Document 3) Korean Patent No. 10-1711826 (Feb. 24, 2017)
(Patent Document 4) Korean Patent No. 10-1938576 (Jan. 9, 2019)

SUMMARY

An object of the present disclosure is to provide a power recliner in which when a load is applied to a recliner, wedges are in direct/indirect contact with a burring part of an internal gear and in contact with and supported on an inner sidewall surface of a support groove provided in the internal gear, thereby improving maximum strength (ensured strength) of the recliner.

Another object of the present disclosure is to provide a power recliner in which when a load is applied to the recliner, the load (external force) transmitted to wedges is transmitted to a burring part of an internal gear and an inner sidewall surface of a support groove, such that the load is dispersed, and the dispersion of the load improves operability and durability of the recliner.

The present disclosure provides a power recliner including a seatback having an angle that is adjusted when an external gear coupled to an accommodation groove of an internal gear is eccentrically rotated as wedges are operated, in which a support groove having a depth difference is formed in the accommodation groove of the internal gear and maintains a predetermined radius based on a burring part, in which the wedges are installed and inserted into the support groove so as to be moved along the support groove, and in which when a load is applied to a seatback, the wedges are dually in contact with a cam and an inner sidewall surface of the support groove or dually in contact with the burring part of the internal gear and the inner sidewall surface of the support groove to disperse the load, thereby improving maximum strength of the recliner.

According to the present disclosure, when a load, which may deform the burring part of the internal gear, is applied to the recliner due to impact or the like, one side of the wedges is in contact with and supported by one side of the support groove of the internal gear to disperse the load transmitted to the burring part of the internal gear, thereby preventing deformation of the burring part of the internal gear and stably maintaining the engagement between the internal gear and the external gear.

According to the present disclosure, the support protrusions protruding from the wedges are inserted into the support groove of the internal gear, and the support protrusions of the wedges are in contact with and supported on the support groove of the internal gear when a load is applied to the recliner, thereby providing the power recliner with improved high ensured strength (maximum strength).

According to the present disclosure, the support protrusions of the wedges are assembled to have a predetermined gap G from the support groove of the internal gear accommodation groove, such that the wedges are smoothly rotated by the lever socket.

The present disclosure may be applied not only to a power recliner having a cam, but also to a power recliner having no cam.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 3A and 3B are exemplified views illustrating a configuration of an internal gear according to the present disclosure;

FIGS. 4A to 4C are exemplified views illustrating configurations of wedges according to the present disclosure;

DETAILED DESCRIPTION OF THE EMBODIMENT

Figure 1:
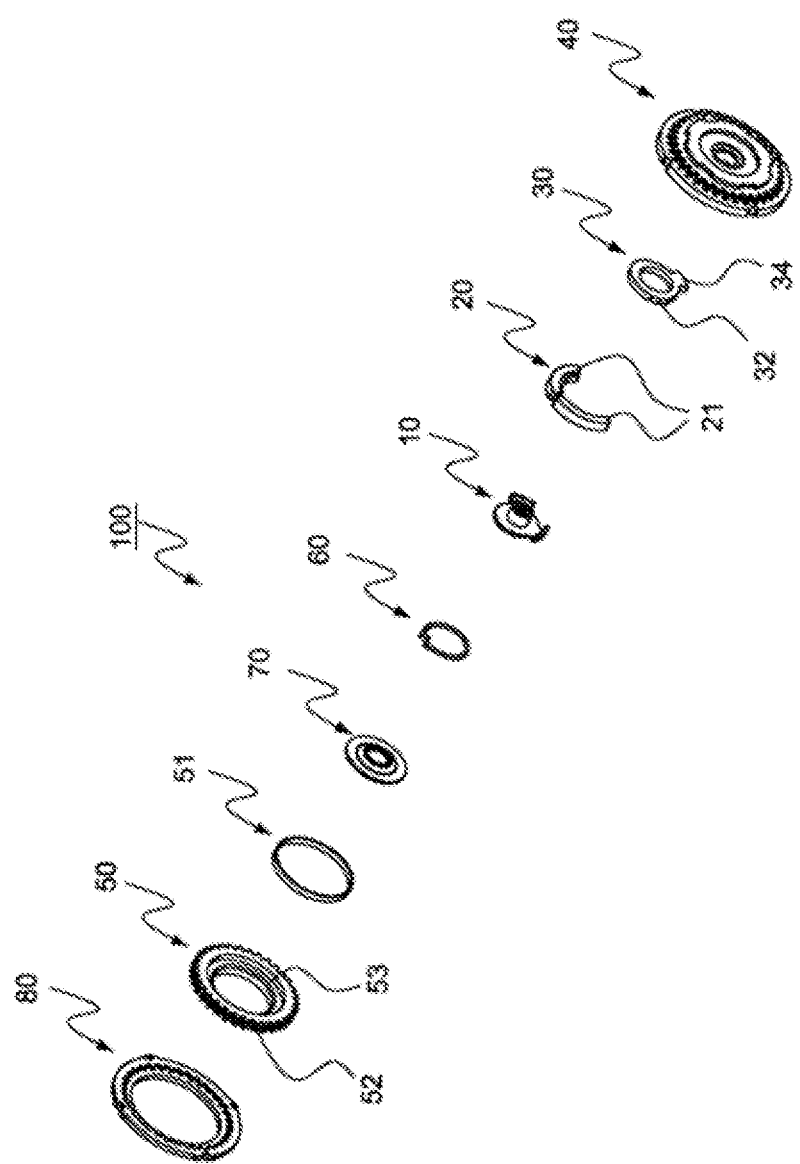
FIG. 1 is an exemplified view illustrating a configuration of a power recliner having a cam according to the present disclosure.

The present disclosure provides a power recliner including a seatback having an angle that is adjusted when an external gear coupled to an accommodation groove of an internal gear is eccentrically rotated as wedges are operated by a rotation of a lever socket, in which a support groove having a depth difference is formed in the accommodation groove of the internal gear and maintains a predetermined radius based on a burring part, in which one side of the wedges are installed and inserted into the support groove so as to be moved along the support groove, and in which when a load is applied to a seatback, the wedges are dually in contact with a cam and an inner sidewall surface of the support groove or dually in contact with the burring part of the internal gear and the inner sidewall surface of the support groove to disperse the load.

That is, the present disclosure provides a power recliner in which an external gear having one side engaging with an internal gear is rotated as a wedge and a cam are rotated by a lever socket or a power recliner in which an external gear having one side engaging with an internal gear is rotated as a wedge is rotated by a lever socket. A support groove having a depth difference is formed in an inner surface of an accommodation groove of the internal gear that accommodates the external gear, and one side of the wedges is installed and inserted into the support groove so that the wedges move along the support groove. When a load is applied to a seatback, the wedges are dually in contact with a cam and an inner sidewall surface of the support groove or dually in contact with a burring part of the internal gear and the inner sidewall surface of the support groove. Therefore, the load (external force) transmitted to the wedges are simultaneously transmitted to the burring part of the internal gear and the inner sidewall surface of the support groove, such that the load is dispersed, the dispersion of the load improves the maximum strength of the recliner.

As illustrated in FIGS. 1 to 11, the present disclosure may be applied to all power recliners 100 each including a cam 30, wedges 20, a wedge spring 60, an internal gear 40 having a burring part 42, an external gear 50 having a press-fitted bearing 51, and a lever socket 10. Alternatively, as illustrated in FIGS. 12 to 15, the present disclosure may be applied to all power recliners 100' each including wedges 20, a wedge spring 60, an internal gear 40 having a burring part 42, an external gear 50 having a press-fitted bearing 51, and a lever socket 10. Therefore, the present disclosure is not limited to the configuration of the power recliner.

Hereinafter, the embodiment will be described in detail with reference to the accompanying drawings in consideration of the presence and absence of a cam in order to help understand the present disclosure.

Figure 2:
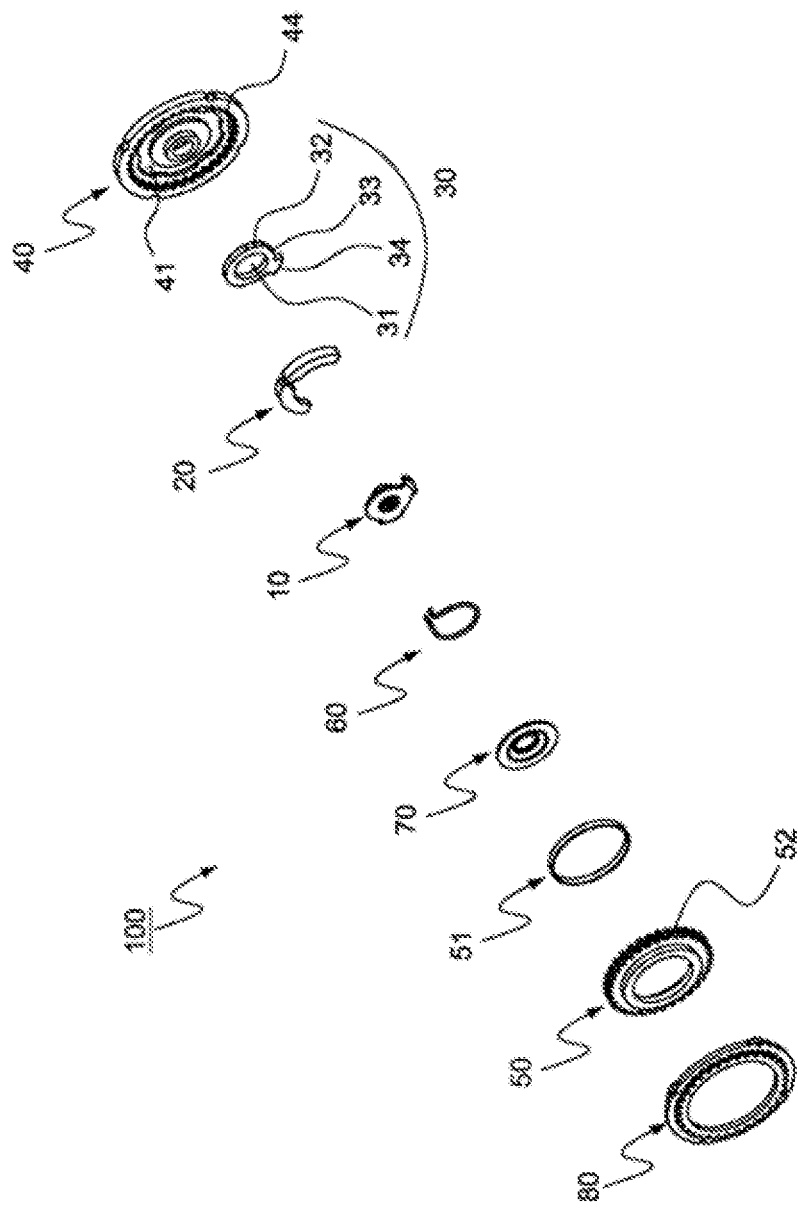
FIG. 2 is another exemplified view illustrating a configuration of the power recliner having the cam according to the present disclosure.
Figure 5:
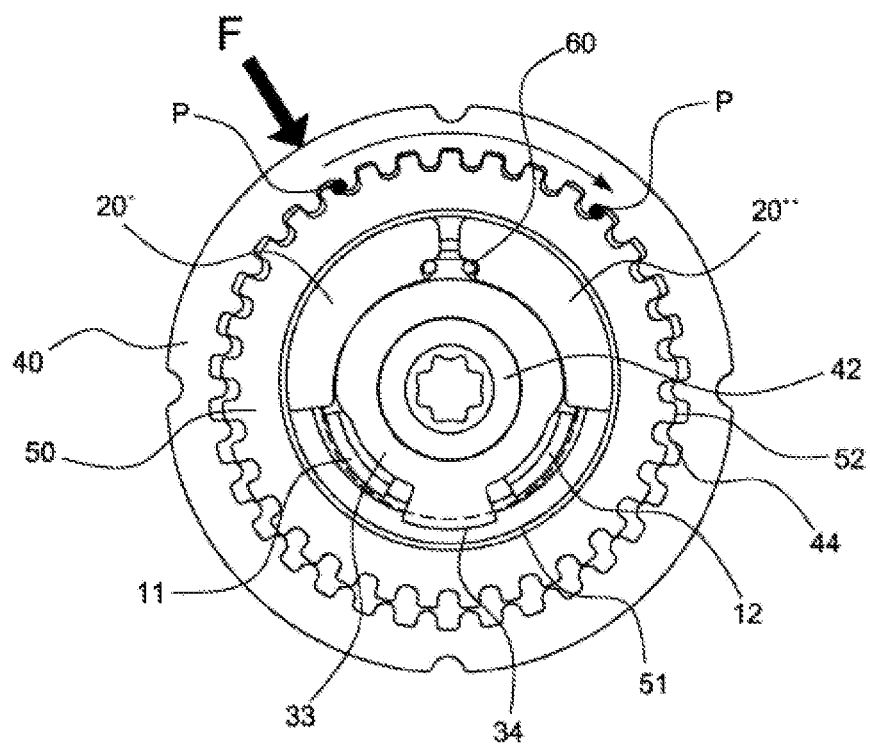
FIG. 5 is an exemplified view illustrating an assembled configuration of the power recliner according to the present disclosure.
Figure 6:
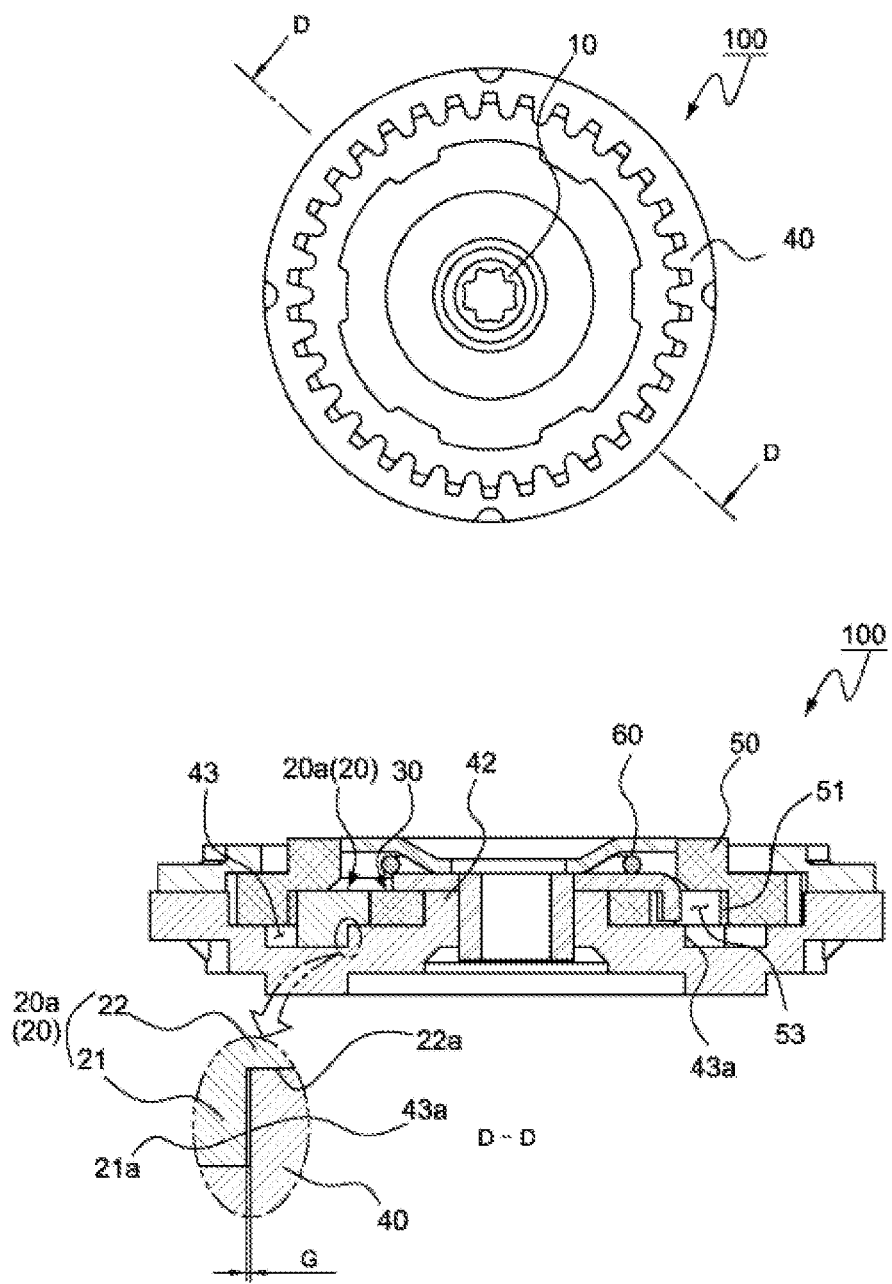
FIG. 6 is a first exemplified view illustrating an internal configuration of the power recliner according to the present disclosure.
Figure 7:
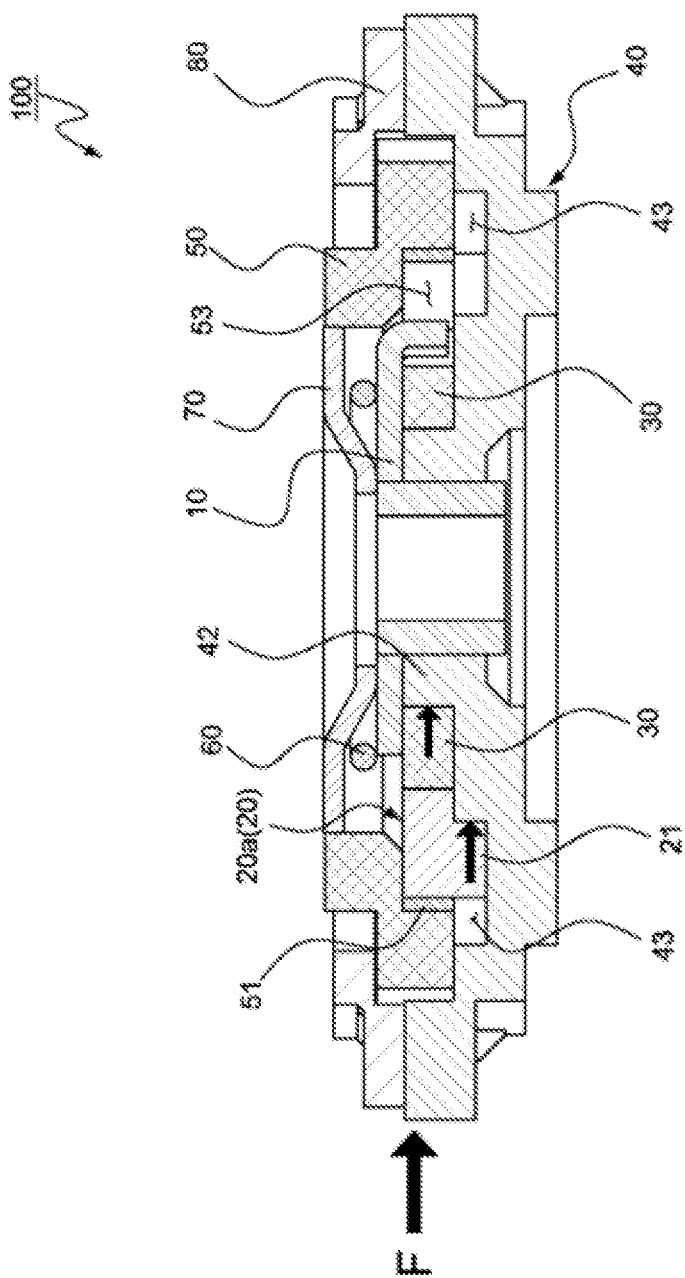
FIG. 7 is an exemplified view illustrating a process of dispersing a load according to FIG. 6.
Figure 8:
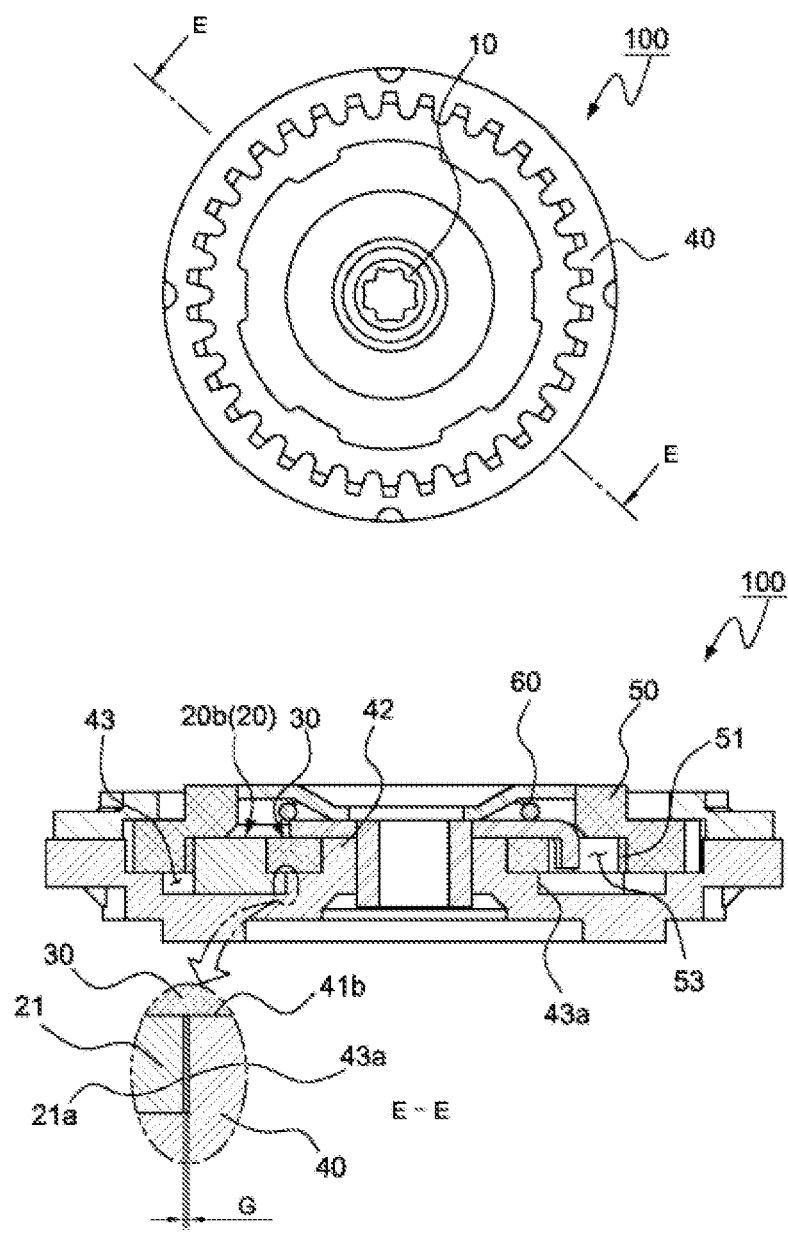
FIG. 8 is a second exemplified view illustrating an internal configuration of the power recliner according to the present disclosure.
Figure 9:
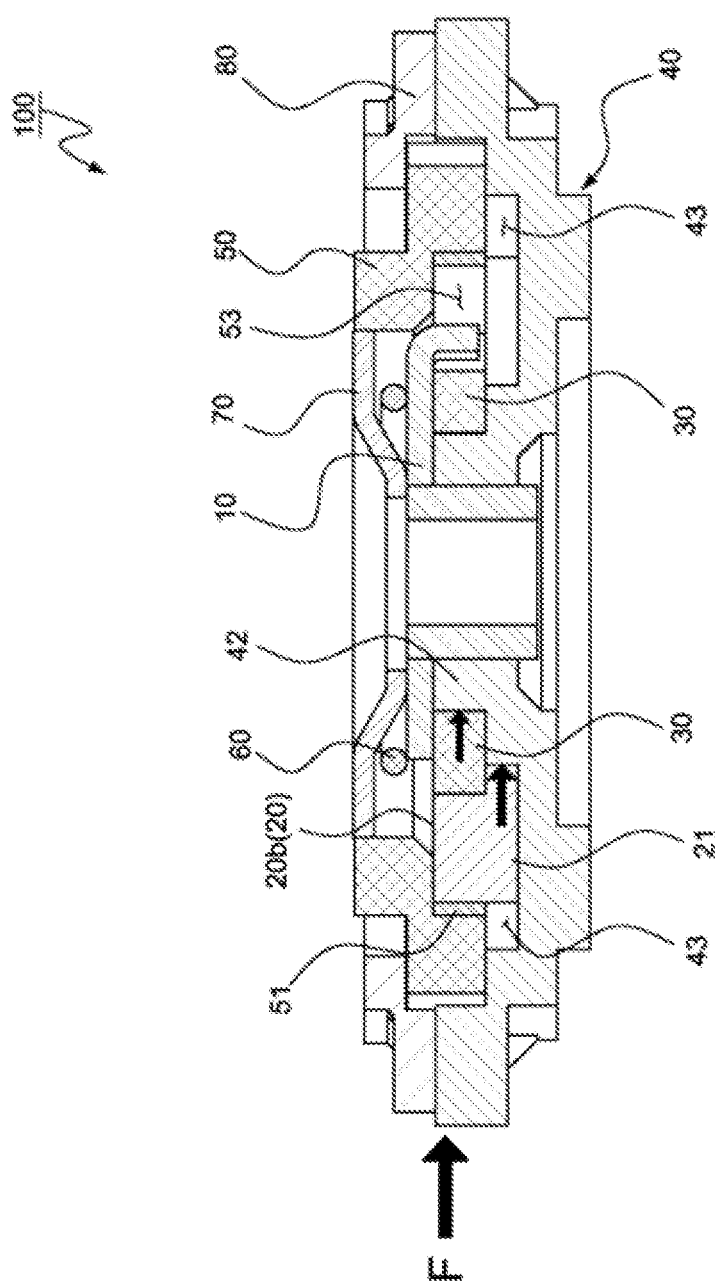
FIG. 9 is an exemplified view illustrating a process of dispersing a load according to FIG. 8.
Figure 10:
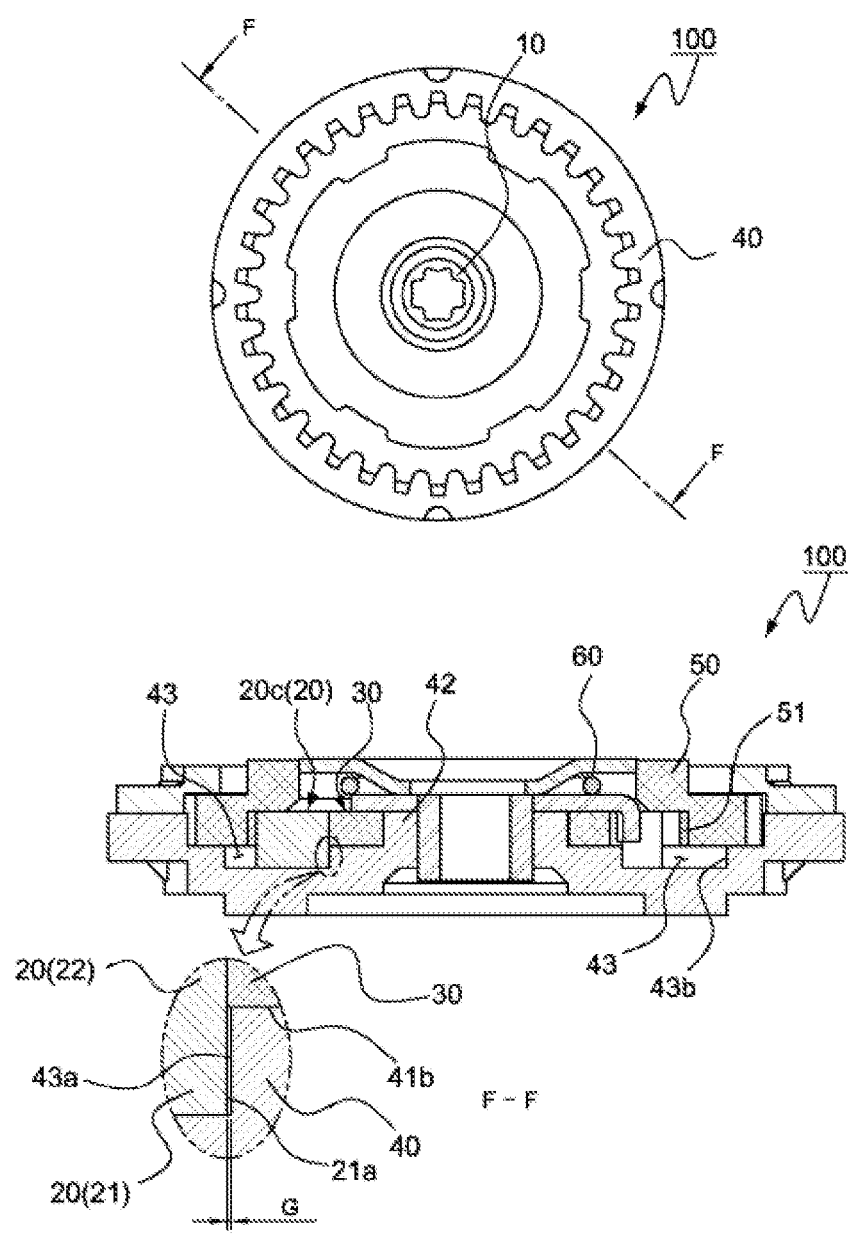
FIG. 10 is a third exemplified view illustrating an internal configuration of the power recliner according to the present disclosure.
Figure 11:
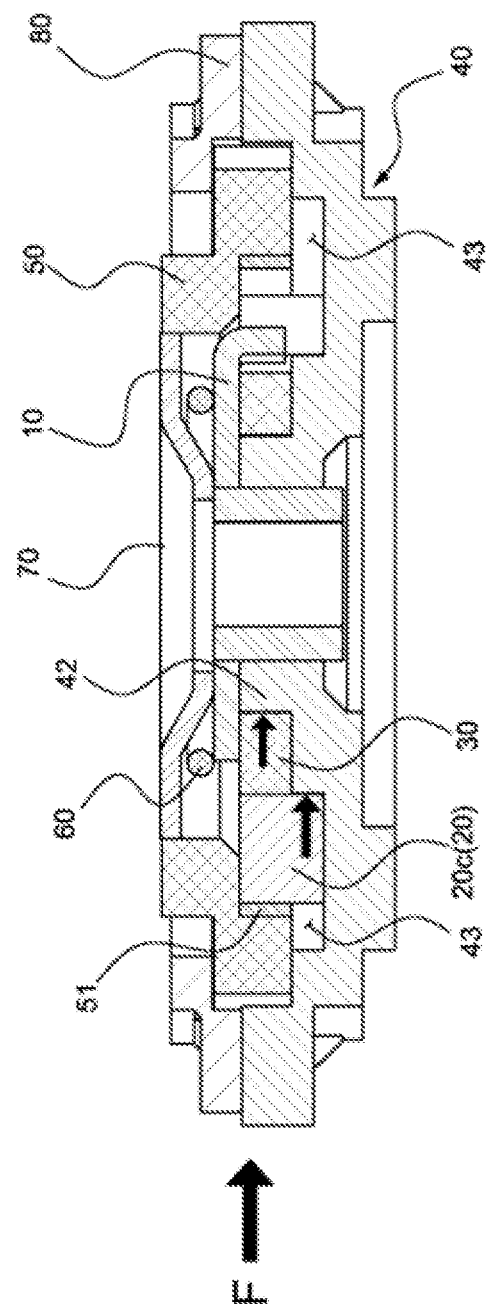
FIG. 11 is an exemplified view illustrating a process of dispersing a load according to FIG. 10.

FIG. 1 is an exemplified view illustrating a configuration of a power recliner having a cam according to the present disclosure, FIG. 2 is another exemplified view illustrating a configuration of the power recliner having the cam according to the present disclosure, FIGS. 3A and 3B are exemplified views illustrating a configuration of an internal gear according to the present disclosure, FIGS. 4A to 4C are exemplified views illustrating configurations of wedges according to the present disclosure, FIG. 5 is an exemplified view illustrating an assembled configuration of the power recliner according to the present disclosure, FIG. 6 is a first exemplified view illustrating an internal configuration of the power recliner according to the present disclosure, FIG. 7 is an exemplified view illustrating a process of dispersing a load according to FIG. 6, FIG. 8 is a second exemplified view illustrating an internal configuration of the power recliner according to the present disclosure, FIG. 9 is an exemplified view illustrating a process of dispersing a load according to FIG. 8, FIG. 10 is a third exemplified view illustrating an internal configuration of the power recliner according to the present disclosure, and FIG. 11 is an exemplified view illustrating a process of dispersing a load according to FIG. 10. The present disclosure may include: an internal gear 30 including a burring part 42 protruding at a center thereof, internal teeth 44 formed on an inner circumferential surface of an accommodation groove, and a support groove 43 formed at a predetermined depth in an inner surface 41a of the accommodation groove so as to be positioned between the burring part 42 and the internal teeth 44; a cam 30 installed with one side being contact with the burring part of the internal gear; an external gear 50 eccentrically inserted into the accommodation groove 41 of the internal gear and including a press-fitted bearing 51 and external teeth 52 formed on an outer circumferential surface thereof and having one side engaging with the internal teeth 44 of the internal gear; a pair of wedges 20 disposed between the cam 30 and the bearing 51 of the external gear and installed such that one side of each of the pair of wedges 20 is inserted into the support groove 43 of the internal gear; and a lever socket 10 configured to rotate the wedges 20 and the cam 30 and having one side fitted into the burring part 42 of the internal gear.

As illustrated in FIGS. 1 to 3, the internal gear 40 includes: the accommodation groove 41 into which the external gear 50 is eccentrically inserted; the internal teeth 44 formed on the inner circumferential surface of the accommodation groove and having one side engaging with the external teeth 52 of the external gear; the burring part 42 protruding and positioned at the center of the accommodation groove 41; and the support groove 43 formed at a predetermined depth so as to be positioned between the internal teeth 44 and the burring part 42 and have a depth difference with the inner surface 41a of the accommodation groove.

That is, the internal gear 40 according to the present disclosure has the accommodation groove 41 that accommodates the cam 30, the pair of wedges 20, and the external gear 50, and the support groove 43 is formed to have a depth difference with the inner surface 41a of the accommodation groove, such that the accommodation groove 41 and the support groove 43 defines a dual groove structure.

One side of each of the wedges 20 is inserted into the support groove 43. Therefore, when a high load is applied to the recliner due to impact applied from the seatback, one side of the wedge inserted into the support groove is in contact with and supported on an inner sidewall surface 43a of the support groove 43, thereby dispersing the load and improving maximum strength of the recliner.

The support groove 43 is configured in a ring type (loop type) having a predetermined radius based on the burring part 42 and formed in the inner surface 41a of the accommodation groove so as to be positioned between the burring part 42 and the internal teeth 44 of the internal gear.

In addition, the inner surface 41a of the accommodation groove 41 has a first inner surface 41b and a second inner surface 41c defined by the support groove 43. That is, the inner surface 41a of the accommodation groove 41 includes: the first inner surface 41b positioned between the support groove 43 and the burring part 42 and configured to allow the cam 30 and the wedges 20 or the cam 30 to be rotatably seated and supported on the first inner surface 41b; and the second inner surface 41c positioned between the support groove 43 and the internal teeth 44 and configured to allow the external gear 50 to be rotatably seated and supported on the second inner surface 41c.

In addition, the support groove 43 includes the inner sidewall surface 43a, and an outer sidewall surface 43b spaced apart from the inner sidewall surface 43a at a predetermined distance. When the load is applied, support protrusions 21 of the wedges come into contact with and are supported on the inner sidewall surface 43a, and the support protrusions of the wedges are spaced apart from the outer sidewall surface 43b at a predetermined distance and do not come into contact with the outer sidewall surface 43b, such that the wedges are easily rotated by the lever socket.

In this case, the inner sidewall surface 43a is connected to the first inner surface 41b, and the outer sidewall surface 43b is connected to the second inner surface 41c.

The cam 30 serves to transmit a rotational force of the lever socket 10 to the external gear 50 and serves to maintain the locked state of the recliner as one side of the cam 30 comes into close contact with the wedges 20 and the burring part 42.

As illustrated in FIGS. 1 and 2, the cam 30 may include: a cam body 33 having a cam center hole 31 into which the burring part 42 of the internal gear is inserted, the cam body 33 having a wedge contact surface 32 configured to come into contact with one side of each of the wedges 20; and a cam protrusion 34 protruding from another side of the cam body 33 at which the wedge contact surface 32 is not formed, the cam protrusion 34 being configured to come into contact with one side of the lever socket 10.

The wedge contact surface 32 is integrated with one side of the cam body 33, and the cam protrusion 34 is integrated with the other side of the cam body 33. One side of the wedge contact surface 32 comes into contact with one side of each of the wedges 20, and a frictional force is generated between the cam 30, the bearing 51, and the wedges 20, thereby maintaining the locked state of the recliner.

The cam protrusion 34 comes into contact with one side of the lever socket 10 that rotates, i.e., the cam protrusion 34 comes into contact with a first operating protrusion 11 or a second operating protrusion 12 in a rotation direction of the lever socket 10 to transmit a rotational force of the lever socket to the cam body 33.

The cam 30 configured as described above is installed and assembled with the internal gear such that the burring part 42 is inserted into the cam center hole 31 and the cam 30 is rotatably seated and supported on the first inner surface 41b of the internal gear accommodation groove 41.

As illustrated in FIGS. 1 and 2, the external gear 50 has a central portion having a center hole 53 into which the bearing 51 is press-fitted. The external teeth 52 are continuously formed on the outer circumferential surface of the external gear 50 and have one side engaging with the internal teeth 44 of the internal gear. The external gear 50 is inserted into the accommodation groove 41 of the internal gear so that one side of the external teeth 52 engages with one side of the internal teeth 44 of the internal gear.

As illustrated in FIGS. 1 and 2, the two wedges 20 are configured as a pair of wedges having the same configuration and are disposed symmetrically between the cam 30 and the bearing 51 of the external gear. The wedges 20 serve to maintain the state in which the internal teeth 44 of the internal gear and the external teeth 52 of the external gear eccentrically engage with one another. The wedges 20 serve to maintain the locked state of the recliner.

The wedge 20 has a wedge shape having a width that gradually decreases from one end 23, at which the spring support groove 25 is provided, toward the other end 24 with which one side of the lever socket 10 is contact.

The wedge 20 includes a wedge body 22 installed to be positioned between the cam 30 and the bearing 51, and the support protrusion 21 integrated with the wedge body so as to be inserted into the support groove 43 of the internal gear.

The wedge body 22 has an outer wedge circumferential surface 22b, which is in contact with and supported on the bearing 51 of the external gear, and an inner wedge circumferential surface 22a having one side being in contact with and supported on one side of the wedge contact surface 32 of the cam.

The support protrusion 21 is integrated with the wedge body 22 so as to be provided from one end 23 to the other end 24 of the wedge body, such that when the load is applied to the recliner, the protrusion stepped surface 21a is in contact with and supported on the inner sidewall surface 43a of the support groove.

The wedge 20 has the support protrusion 21 formed on the wedge body 22 such that the inner wedge circumferential surface 22a and the protrusion stepped surface 21a have a level difference therebetween. As illustrated in FIG. 4A, the wedge 20 may be a wedge 20a formed such that a width W1 of the wedge body 22 is larger than a width W2 of the support protrusion 21.

In addition, the wedge 20 has the support protrusion 21 formed on the wedge body 22 such that the inner wedge circumferential surface 22a and the protrusion stepped surface 21a have a level difference therebetween. As illustrated in FIG. 4B, the wedge 20 may be a wedge 20b formed such that the width W1 of the wedge body 22 is smaller than the width W2 of the support protrusion 21.

In addition, the wedge 20 may be configured such that the inner wedge circumferential surface 22a of the wedge body, which has one side which is in contact with and supported on the cam 30, integrally extends from a protrusion stepped surface 21a of the support protrusion inserted into the support groove 43, i.e., integrally extends without a level difference between the inner wedge circumferential surface 22a of the wedge body and the protrusion stepped surface 21a of the support protrusion. For example, as illustrated in FIG. 4C, the wedge 20 may be a wedge 20c formed such that the width W1 of the wedge body 22 is equal to the width W2 of the support protrusion 21 so that the inner wedge circumferential surface 22a and the protrusion stepped surface 21a integrally extend. That is, the wedge 20c may be formed such that the inner wedge circumferential surface 22a of the wedge body corresponds to the protrusion stepped surface 21a of the support protrusion, and the protrusion stepped surface 21a of the support protrusion corresponds to the inner wedge circumferential surface 22a of the wedge body.

In addition, in the case in which the wedge 20 is the wedge 20a formed such that the width W1 of the wedge body 22 is larger than the width W2 of the support protrusion 21 as illustrated in FIG. 4A, the cam 30 is installed to be seated on the inner surface of the accommodation groove, i.e., the first inner surface 41b as illustrated in FIGS. 6 and 7.

In addition, in the case in which the wedge 20 is the wedge 20b having the support protrusion 21 protruding from the wedge body 22 such that the width W1 of the wedge body is smaller than the width W2 of the support protrusion as illustrated in FIG. 4B, the cam 30 is installed to be seated on the support protrusion 21 and the first inner surface 41b of the accommodation groove as illustrated in FIGS. 8 and 9.

In addition, in the case in which the wedge 20 is the wedge 20c having the wedge body 22 and the support protrusion 21 that integrally extend such that the width W1 of the wedge body is equal to the width W2 of the support protrusion as illustrated in FIG. 4C, the cam is installed such that the wedge contact surface 32 is positioned on the support groove 43 of the accommodation groove as illustrated in FIGS. 10 and 11.

In this case, the width W1 of the wedge body means a length (distance) from the outer wedge circumferential surface 22b to the inner wedge circumferential surface 22a of the wedge body, and the width W2 of the support protrusion means a length (distance) from an outer protrusion circumferential surface 21b to the protrusion stepped surface 21a of the support protrusion.

In addition, the outer wedge circumferential surface 22b of the wedge body and the outer protrusion circumferential surface 21b of the support protrusion may integrally extend or be formed with a level difference therebetween. In particular, the outer wedge circumferential surface 22b of the wedge body and the outer protrusion circumferential surface 21b of the support protrusion integrally extend without a level difference. In addition, in the case in which the outer wedge circumferential surface 22b of the wedge body and the outer protrusion circumferential surface 21b of the support protrusion integrally extend without a level difference, the outer wedge circumferential surface 22b and the outer protrusion circumferential surface 21b define a single curved surface, such that the outer wedge circumferential surface 22b corresponds to one surface having one side being in contact with the bearing 51, and the outer protrusion circumferential surface 21b corresponds to one surface inserted into the support groove 43.

The wedges 20 configured as described above are installed symmetrically between the cam 30 and the bearing 51 press-fitted into the external gear, such that the support protrusions 21 are inserted into the support groove 43 of the internal gear, and the wedge bodies 22 are positioned in the accommodation groove 41. In this case, two opposite ends of a wedge spring 60 are installed, inserted, and supported in spring support grooves 25 of the wedges 20.

In addition, when the wedge bodies 22 of the wedges are inserted and installed to be positioned between the cam 30 and the bearing 51 of the external gear, the support protrusions 21 are installed and inserted into the support groove 43 with a predetermined gap G between the protrusion stepped surfaces 21a and the inner sidewall surface 43a of the support groove, and the outer protrusion circumferential surfaces 21b are positioned to be spaced apart from the outer sidewall surface 43b of the support groove at a predetermined distance as illustrated in FIGS. 6, 8, and 10.

The gap G is set in consideration of assembly tolerance for improving operability of the wedge 20. Further, the gap G is set in consideration of a range in which the burring part is not deformed and there is neither loss of the tooth nor withdrawal of the tooth on the contact portion P illustrated in FIG. 5 when a load (external force) is transmitted in a direction of the external gear→the wedges→the cam→the burring part of the internal gear through a contact portion P between the internal gear and the external gear.

For example, the gap G is set within a range of 0.1 to 0.4 mm, particularly, a range of about 0.2 to 0.3 mm.

If the gap G is set to be less than 0.1 mm, the protrusion stepped surfaces 21a of the support protrusions come into contact with the inner sidewall surface 43a of the support groove when the wedges are operated by the lever socket, which causes a deterioration in operability of the wedges (operability of the recliner) and a decrease in frictional contact force of the burring part 42, the cam 30, the wedges 20, and the bearing 51. As a result, the recliner is not smoothly locked.

In addition, if the gap G is set to be more than 0.4 mm, a load applied to the recliner due to impact applied from the seatback is transmitted to the burring part 42 of the internal gear through the cam 30 before the protrusion stepped surfaces 21a of the support protrusions are in contact with and supported on the inner sidewall surface 43a of the support groove, which causes deformation of the burring part 42. Therefore, the gap G is set within an appropriate range.

The wedges 20, which are installed as described above, maintain the eccentricity of the internal gear 40 and the external gear 50 and rotate the external gear 50 by rotating in the rotation direction of the lever socket 10 in conjunction with the rotation of the lever socket 10.

That is, the two opposite ends of the wedge spring 60 are installed and inserted into and supported by the spring support grooves 25 of the wedges 20. The wedges 20 are moved close to each other by the rotation of the lever socket 10 and moved away from each other by an elastic force of the wedge spring 60, and the movements of the wedges 20 are repeated to rotate the external gear 50. Because the configuration and function of the recliner operated by the operation of the wedges are well known, a detailed description of the operation of the recliner will be omitted.

As illustrated in FIGS. 1, 2, and 5, the wedge spring 60 is installed such that the two opposite ends of the wedge spring 60 are connected to and supported by the spring support grooves 25 of the wedges 20 so that the pair of wedges are moved away from each other by the elastic force of the wedge spring 60. Therefore, the wedges 20 are in close contact with the cam 30 and the bearing 51 and generate the frictional force between the burring part 42 of the internal gear and the bearing 51 of the external gear (the locked state between the internal gear and the external gear is maintained).

The lever socket 10 is axially coupled to a drive shaft (not illustrated) and serves to transmit driving power to the wedges 20 or to the wedges 20 and the cam 30 simultaneously. As illustrated in FIGS. 1, 2, and 5, the lever socket 10 has the first and second operating protrusions 11 and 12 which are spaced apart from each other at a predetermined distance, protrude, and serve to move one wedge 20' and the cam 30 or move the other wedge 20" and the cam 30.

The first and second operating protrusions 11 and 12 protrude to be positioned between the cam 30 and the bearing 43. The first operating protrusion 11 is positioned between one wedge 20' and the cam protrusion 34 of the cam, and the second operating protrusion 12 is positioned between the other wedge 20" and the cam protrusion 34 of the cam.

The lever socket 10 is connected to a motor through the drive shaft (not illustrated) and operated by an operation of the motor. Alternatively, the drive shaft (not illustrated) is connected to an operating dial, such that the lever socket 10 is operated manually by an occupant.

According to the present disclosure configured as described above, when the lever socket rotates, the first operating protrusion (or the second operating protrusion) of the lever socket comes into contact with the other end of one wedge (or the other wedge), and one wedge (or the other wedge) rotates in the rotation direction of the lever socket. Further, the second operating protrusion (or the first operating protrusion) of the lever socket comes into contact with the cam protrusion of the cam, and the cam rotates. Further, the other wedge (or one wedge) is rotated in the rotation direction of the lever socket by the elastic force of the wedge spring, such that the external gear eccentrically rotates, and the angle of the seatback is adjusted (the angle of the recliner is adjusted).

In addition, according to the present disclosure, the pair of wedges moves away from each other by the elastic force of the wedge spring, such that the wedges are kept in contact with the cam and the bearing of the external gear. Therefore, one side of the external teeth of the external gear engages with one side of the internal teeth of the internal gear, such that the locked state is implemented. In this case, the support protrusions of the wedges are positioned in the support groove of the internal gear, such that the protrusion stepped surfaces of the support protrusions are disposed with the predetermined gap G from the inner sidewall surface of the support groove (the locked state of the recliner).

In addition, according to the present disclosure, when a load is applied to the recliner due to impact applied from the seatback in the state in which the recliner is locked, an external force (load) is transmitted to the external gear through the gear contact portion (contact point P) between the internal teeth of the internal gear and the external teeth of the external gear, and the external force transmitted to the external gear is transmitted to the external gear→the wedge→the cam→the burring part of the internal gear, such that the load is supported by the burring part, as illustrated in FIG. 5.

In addition, when the load applied to the recliner is increased, the wedges are moved toward the burring part by the external gear, and one side of the support protrusions of the wedges, i.e., the protrusion stepped surface of the support protrusion is in contact with the inner sidewall surface of the support groove of the internal gear, such that the wedges are supported. As illustrated in FIGS. 7, 9, and 11, the external force applied to the external gear is dispersed and supported by the contact and support between the support protrusions of the wedges and support groove of the internal gear and the contact and support between the wedges and the burring part through the cam, thereby preventing the deformation of the burring part.

FIGS. 12 to 15 illustrate the power recliner 100' in which the wedges are installed to be positioned between the burring part of the internal gear and the bearing of the external gear, and the wedges are rotated by the lever socket, such that the external gear having one side engaging with the internal gear is rotated.

Figure 12:
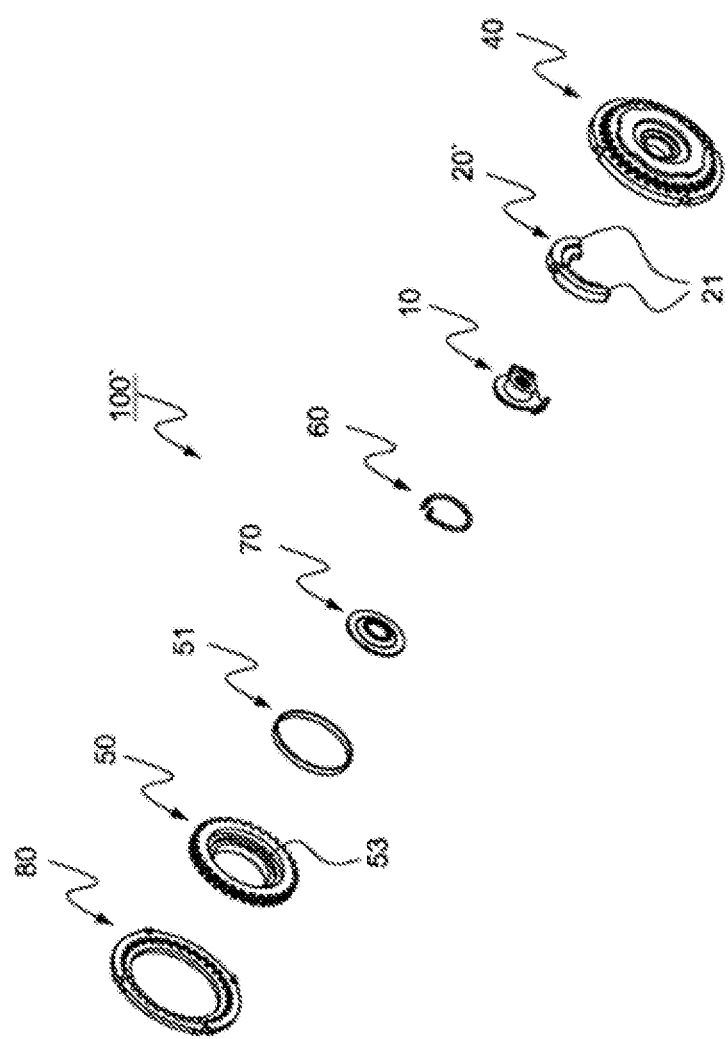
FIG. 12 is an exemplified view illustrating a configuration of a power recliner having no cam according to the present disclosure.
Figure 13:
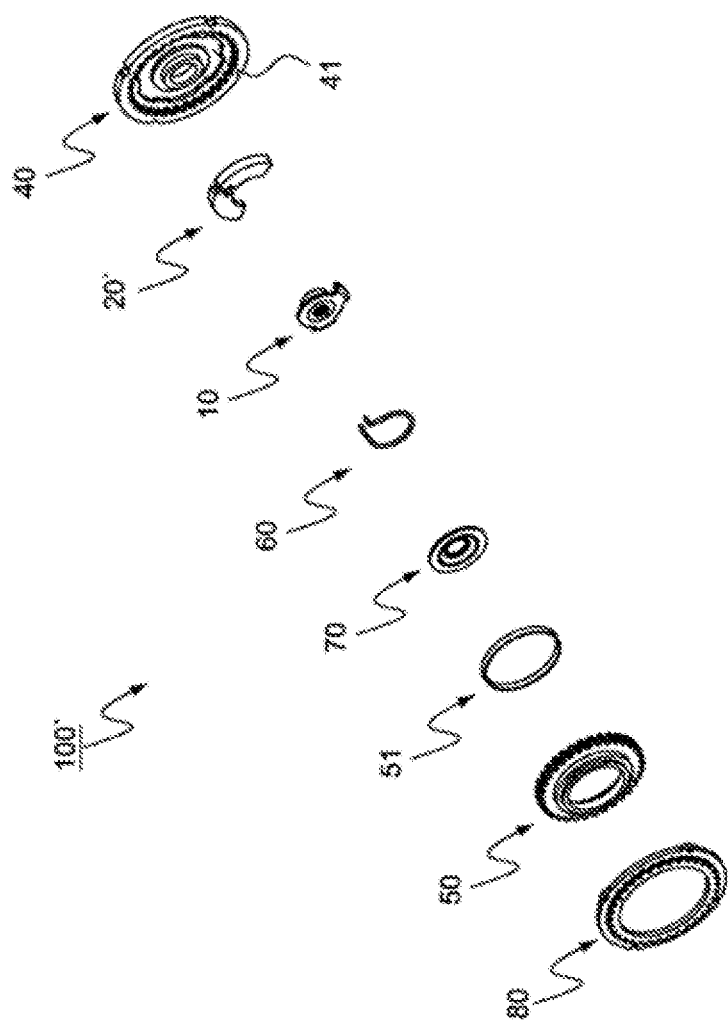
FIG. 13 is another exemplified view illustrating a configuration of the power recliner having no cam according to the present disclosure.
Figure 14:
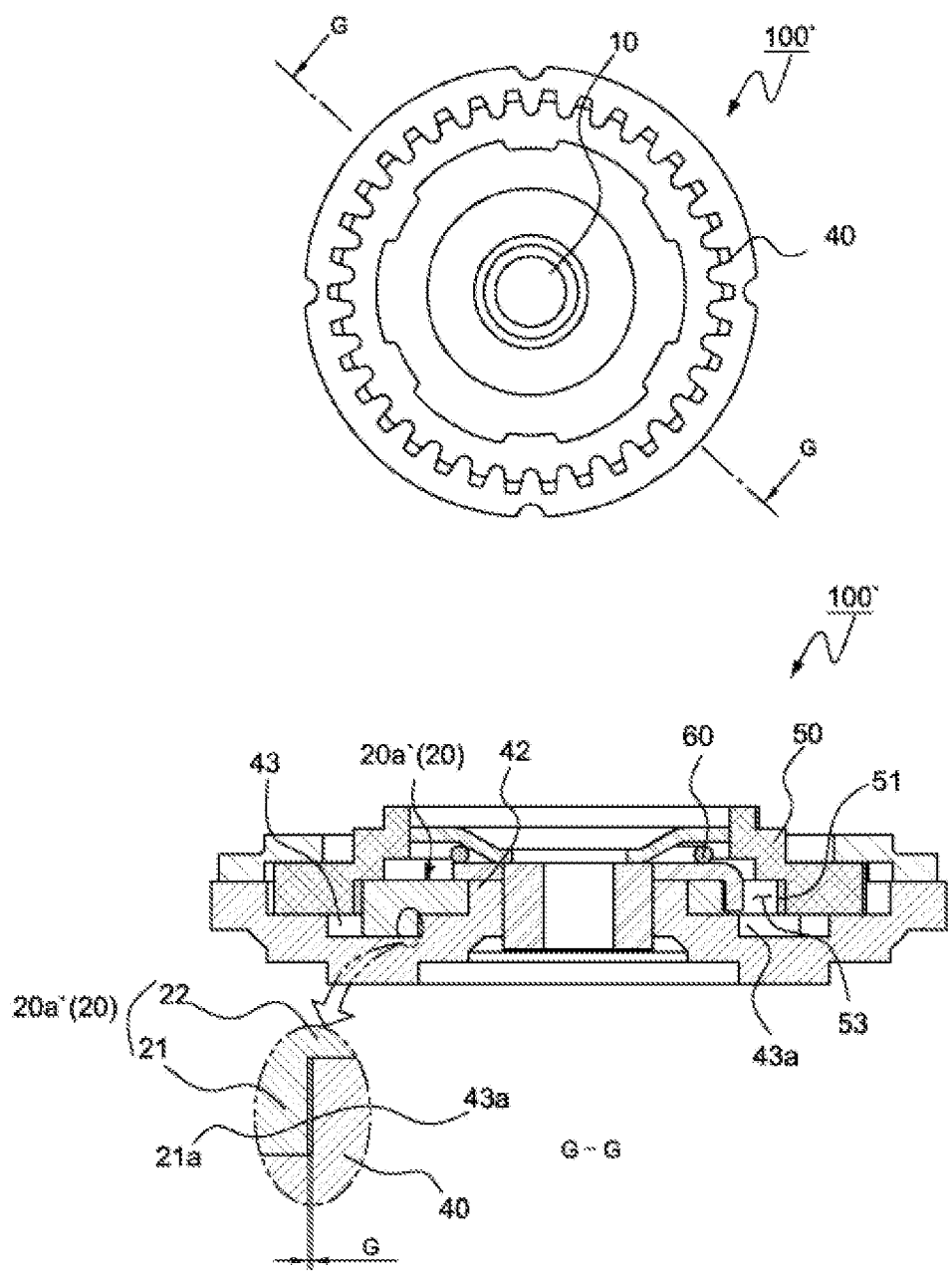
FIG. 14 is a fourth exemplified view illustrating an internal configuration of the power recliner according to the present disclosure.
Figure 15:
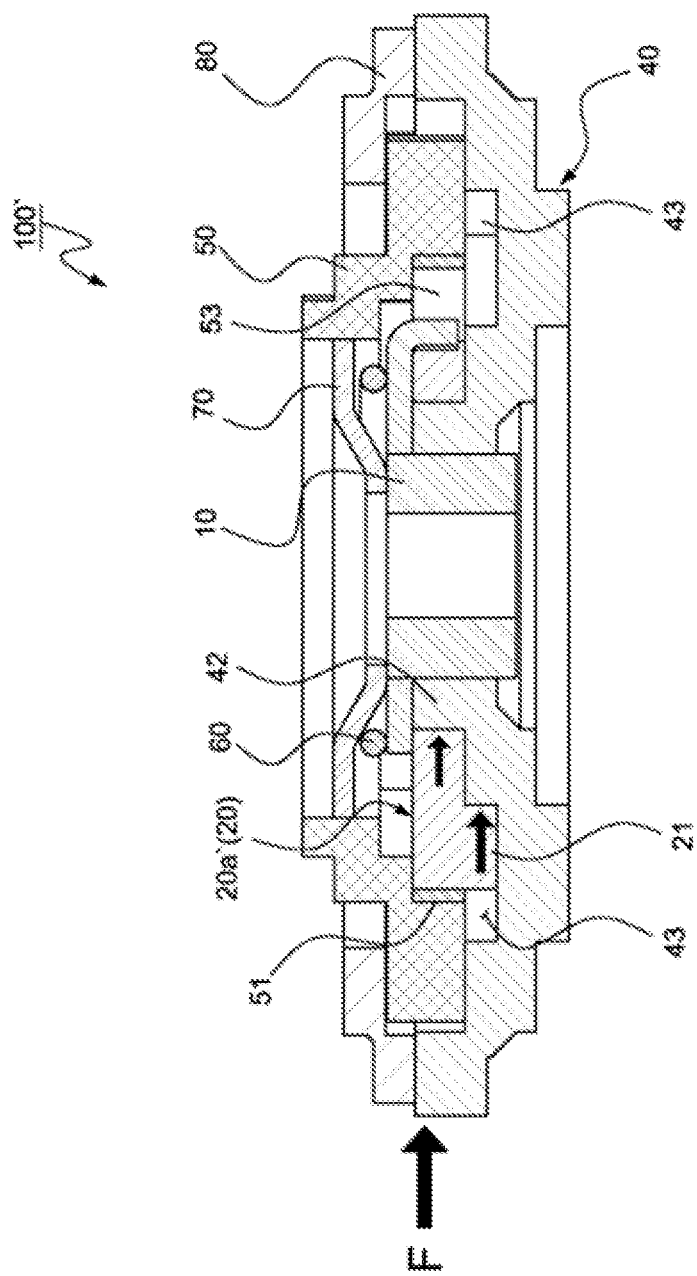
FIG. 15 is an exemplified view illustrating a process of dispersing a load according to FIG. 14.
Figure 16:
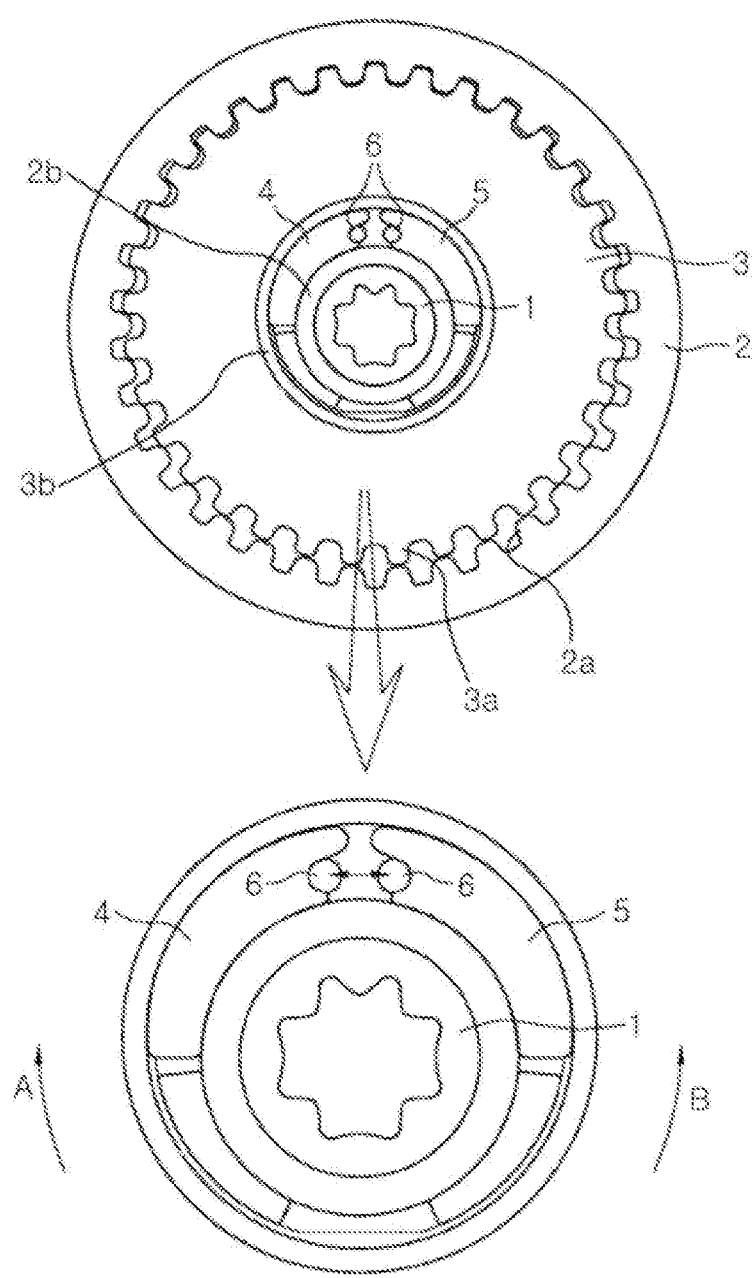
FIG. 16 is an exemplified view illustrating a configuration of a recliner in the related art.

FIG. 12 is an exemplified view illustrating a configuration of a power recliner having no cam according to the present disclosure, FIG. 13 is another exemplified view illustrating a configuration of the power recliner having no cam according to the present disclosure, FIG. 14 is a fourth exemplified view illustrating an internal configuration of the power recliner according to the present disclosure, and FIG. 15 is an exemplified view illustrating a process of dispersing a load according to FIG. 14. According to the power recliner 100' according to the present disclosure, when the load is applied to the seatback, the dual contact/support is implemented as the support protrusions 21 of the wedges are in contact with and supported on the inner sidewall surface 43*a* of the support groove 43 of the internal gear and the inner wedge circumferential surfaces 22*a* of the wedge bodies 22 are in contact with and supported on the burring part 42 of the internal gear. The load may be dispersed by the dual contact/support, such that the engagement between the internal gear 40 and the external gear 50 may be stably maintained.

That is, the present disclosure includes: the internal gear 30 including the burring part 42 protruding at the center thereof, the internal teeth 44 formed on the inner circumferential surface of the accommodation groove, and the support groove 43 formed at a predetermined depth in the inner surface 41*a* of the accommodation groove so as to be positioned between the burring part 42 and the internal teeth 44; the external gear 50 eccentrically inserted into the accommodation groove 41 of the internal gear and including the press-fitted bearing 51 and the external teeth 52 formed on the outer circumferential surface thereof and having one side engaging with the internal teeth 44 of the internal gear; the pair of wedges 20 disposed between the burring part 42 of the internal gear and the bearing 51 of the external gear and installed such that the support protrusions 21 are inserted into the support groove 43 of the internal gear; and the lever socket configured to rotate the wedges 20 and having one side fitted into the burring part 42 of the internal gear. The wedge 20 includes the wedge body 22 installed to be positioned between the cam and the bearing, and the support protrusion 21 integrated with the wedge body 22 so as to be inserted into the support groove 43 of the internal gear. The wedge 20 may be a wedge 20a' formed such that the width W1 of the wedge body 22 is larger than the width W2 of the support protrusion 21. For example, the wedge 20a' may be configured by modifying the wedge 20a illustrated in FIG. 4A.

That is, as illustrated in FIGS. 12 to 15, the support protrusions 21 of the wedges 20a are installed and inserted into the support groove 43 of the accommodation groove of the internal gear, such that the wedge bodies 22 are positioned between the burring part 42 of the internal gear and the bearing 51 of the external gear and the protrusion stepped surfaces 21a of the support protrusions 21 are disposed with the predetermined gap G from the inner sidewall surface 43a of the support groove.

In this case, the gap G is set in consideration of assembly tolerance for improving operability of the wedge 20. Further, the gap G is set in consideration of a range in which the burring part is not deformed and there is neither loss of the tooth nor withdrawal of the tooth on the contact portion P illustrated in FIG. 5 when a load (external force) is transmitted. For example, the gap G is set within a range of 0.1 to 0.4 mm, particularly, a range of about 0.2 to 0.3 mm.

In addition, the internal gear 40 has the accommodation groove 41 that accommodates the pair of wedges 20 and the external gear 50, and the support groove 43 is formed to have a depth difference with the inner surface 41a of the accommodation groove, such that the accommodation groove 41 and the support groove 43 defines a dual groove structure.

The power recliner 100' configured as described above is different from the above-mentioned power recliner 100 in terms of the presence and absence of the cam but has the same structure, connection relationship, and operation as the above-mentioned power recliner 100. Therefore, the description of the detailed configurations of the internal gear 30, the external gear 50, the wedges 20, and the lever socket 10 of the power recliner 100' will be replaced with the description of the internal gear 30, the external gear 50, the wedges 20, and the lever socket 10 of the power recliner 100.

According to the power recliner 100' according to the present disclosure configured as described above, when the lever socket 10 rotates, the first operating protrusion (or the second operating protrusion) of the lever socket 10 comes into contact with the other end of one wedge (or the other wedge), and one wedge (or the other wedge) rotates in the rotation direction of the lever socket. Further, the second operating protrusion (or the first operating protrusion) of the lever socket comes into contact with the other wedge, and the wedge rotates. Further, the other wedge (or one wedge) is rotated in the rotation direction of the lever socket by the elastic force of the wedge spring, such that the external gear eccentrically rotates, and the angle of the seatback is adjusted (the angle of the recliner is adjusted).

In addition, according to the power recliner 100' according to the present disclosure, the pair of wedges 20 moves away from each other by the elastic force of the wedge spring 60, such that the wedges 20 are kept in contact with the burring part 42 of the internal gear and the bearing 51 of the external gear. Therefore, one side of the external teeth 52 of the external gear engages with one side of the internal teeth 44 of the internal gear, such that the locked state is implemented. In this case, the support protrusions of the wedges are positioned in the support groove of the internal gear, such that the protrusion stepped surfaces of the support protrusions are disposed with the predetermined gap G from the inner sidewall surface of the support groove (the locked state of the recliner).

In addition, according to the power recliner 100' according to the present disclosure, when a load is applied to the recliner due to impact applied from the seatback in the state in which the recliner is locked, an external force (load) is transmitted to the external gear through the gear contact portion (contact point) between the internal teeth of the internal gear and the external teeth of the external gear, and the external force transmitted to the external gear is transmitted to the external gear—the wedge→the burring part of the internal gear, such that the load is supported by the burring part.

In addition, when the load applied to the recliner is increased, the wedges are moved toward the burring part by the external gear, and the protrusion stepped surface of the support protrusion of the wedge is in contact with the inner sidewall surface of the support groove of the internal gear, such that the wedges are supported. As illustrated in FIG. 11, the external force applied to the external gear is dispersed and supported by the contact between the support protrusions of the wedges and the support groove and the contact between the wedges and the burring part, thereby preventing the deformation of the burring part.

As described above, the power recliners 100 and 100' according to the present disclosure are configured such that the support protrusions of the wedges are in contact with and supported on one side of the support groove provided in the internal gear when a load is applied. Therefore, the maximum strength of the power recliners 100 and 100' is improved by about 50% or more in comparison with a recliner in the related art in which a load is transmitted to a burring part. For example, according to the present disclosure, when the specification of the maximum strength of 2,000 to 2,200 Nm is required, the maximum strength is improved to be high strength of about 3,000 Nm or more by the dispersion of the load by the dual contact/support between the support protrusion and the support groove and between the cam and the burring part.

In the drawings of the present disclosure, non-described reference numeral 70 indicates a wedge cover, and non-described reference numeral 80 indicates a recliner cover.

The present disclosure is not limited to the specific embodiment described above, various modifications can be made by any person skilled in the art to which the present disclosure pertains without departing from the subject matter of the present disclosure as claimed in the claims, and the modifications are within the scope defined by the claims.

In addition, the terms used to describe the present disclosure are used only for the purpose of distinguishing one constituent element from another constituent element and assisting in understanding the present disclosure, and the constituent elements of the present disclosure should not be limited by the terms.

What is claimed is:

1. A power recliner comprising a seatback having an angle that is adjusted when an external gear coupled to an accommodation groove of an internal gear is eccentrically rotated as wedges are operated by a rotation of a lever socket,
    wherein a support groove having a depth difference with an inner surface of the accommodation groove is formed in the accommodation groove of the internal gear and maintains a predetermined radius based on a burring part,
    wherein support protrusions of the wedges are installed and inserted into the support groove so as to be moved along the support groove, and
    wherein when a load is applied to a seatback, the wedges are dually in contact with a cam and an inner sidewall surface of the support groove or dually in contact with the burring part of the internal gear and the inner sidewall surface of the support groove to disperse the load.

2. The power recliner of claim 1, wherein the power recliner comprises:
    the internal gear comprising the burring part protruding at a center thereof, internal teeth formed on an inner circumferential surface of the accommodation groove, and the support groove formed at a predetermined depth in the inner surface of the accommodation groove so as to be positioned between the burring part and the internal teeth;
    the cam installed with one side being in contact with the burring part of the internal gear;
    the external gear eccentrically inserted into the accommodation groove of the internal gear and having a press-fitted bearing and external teeth formed on an outer circumferential surface thereof and having one side engaging with the internal teeth of the internal gear;
    the pair of wedges disposed between the cam and the bearing of the external gear and installed such that the support protrusions are inserted into the support groove of the internal gear; and
    the lever socket configured to rotate the wedges and the cam and having one side fitted into the burring part of the internal gear,
    wherein when a load is applied to the seatback, the load is dispersed by dual contact and support implemented as one side of the cam is in contact with and supported on the burring part by the wedges and the support protrusions of the wedges are in contact with and supported on one side of the support groove of the internal gear.

3. The power recliner of claim 2, wherein the wedge comprises:
    a wedge body installed to be positioned between the cam and the bearing; and
    the support protrusion integrated with the wedge body so as to be inserted into the support groove of the internal gear,
    wherein the support protrusion is formed on the wedge body, and
    wherein a width (W1) of the wedge body is larger than a width (W2) of the support protrusion.

4. The power recliner of claim 2, wherein the wedge comprises:
    a wedge body installed to be positioned between the cam and the bearing; and
    the support protrusion integrated with the wedge body so as to be inserted into the support groove of the internal gear,
    wherein the support protrusion is formed on the wedge body, and
    wherein a width (W1) of the wedge body is smaller than a width (W2) of the support protrusion.

5. The power recliner of claim 2, wherein the wedge comprises:
    a wedge body installed to be positioned between the cam and the bearing; and
    the support protrusion integrated with the wedge body so as to be inserted into the support groove of the internal gear, and
    wherein the support protrusion is formed on the wedge body.

6. The power recliner of claim 5, wherein the wedge is formed such that a width (W1) of the wedge body is equal to a width (W2) of the support protrusion.

7. The power recliner of claim 1, wherein the power recliner comprises:
    the internal gear comprising the burring part protruding at a center thereof, internal teeth formed on an inner circumferential surface of the accommodation groove, and the support groove formed at a predetermined depth in the inner surface of the accommodation groove so as to be positioned between the burring part and the internal teeth;
    the external gear eccentrically inserted into the accommodation groove of the internal gear and having a press-fitted bearing and external teeth formed on an outer circumferential surface thereof and having one side engaging with the internal teeth of the internal gear;
    the pair of wedges disposed between the bearing of the external gear and the burring part of the internal gear and installed such that the support protrusions are inserted into the support groove of the internal gear; and
    the lever socket configured to rotate the wedges and having one side fitted into the burring part of the internal gear,
    wherein when a load is applied to the seatback, the load is dispersed by dual contact and support implemented as one side of the wedges is in contact with the burring part and the support protrusions of the wedges are in contact with one side of the support groove of the internal gear.

8. The power recliner of claim 7, wherein the wedge comprises:
    a wedge body installed to be positioned between the bearing and the burring part of the internal gear; and
    the support protrusion integrated with the wedge body so as to be inserted into the support groove of the internal gear,
    wherein the support protrusion is formed on the wedge body, and
    wherein a width (W1) of the wedge body is larger than a width (W2) of the support protrusion.

9. The power recliner of claim 8, wherein the support groove comprises an outer sidewall surface, and the outer sidewall surface is spaced apart from the support protrusions of the wedges at a predetermined distance so as not to come into contact with the support protrusions,
    wherein the support protrusions are installed and inserted into the support groove of the accommodation groove so as to have a predetermined gap from the inner sidewall surface of the support groove, wherein when the recliner operates, the support protrusions of the wedges operate while maintaining the predetermined gap (G) from the inner sidewall surface of the support groove, and wherein when a load is applied to the recliner, one side of the support protrusions is in contact with and supported on the inner sidewall surface of the support groove.

10. The power recliner of claim 9, wherein the gap (G) is set within a range of 0.1 to 0.4 mm.

* * * * *